Oct. 8, 1940.　　　F. L. O. WADSWORTH　　　2,217,425
GLASS PRESSING MACHINE
Original Filed March 4, 1935　　3 Sheets-Sheet 1

INVENTOR.
Frank L. O. Wadsworth, Dec.
By Mildred M. Wadsworth, Adm.
BY Green & McCallister
Her ATTORNEYS.

Oct. 8, 1940.   F. L. O. WADSWORTH   2,217,425
GLASS PRESSING MACHINE
Original Filed March 4, 1935   3 Sheets-Sheet 2
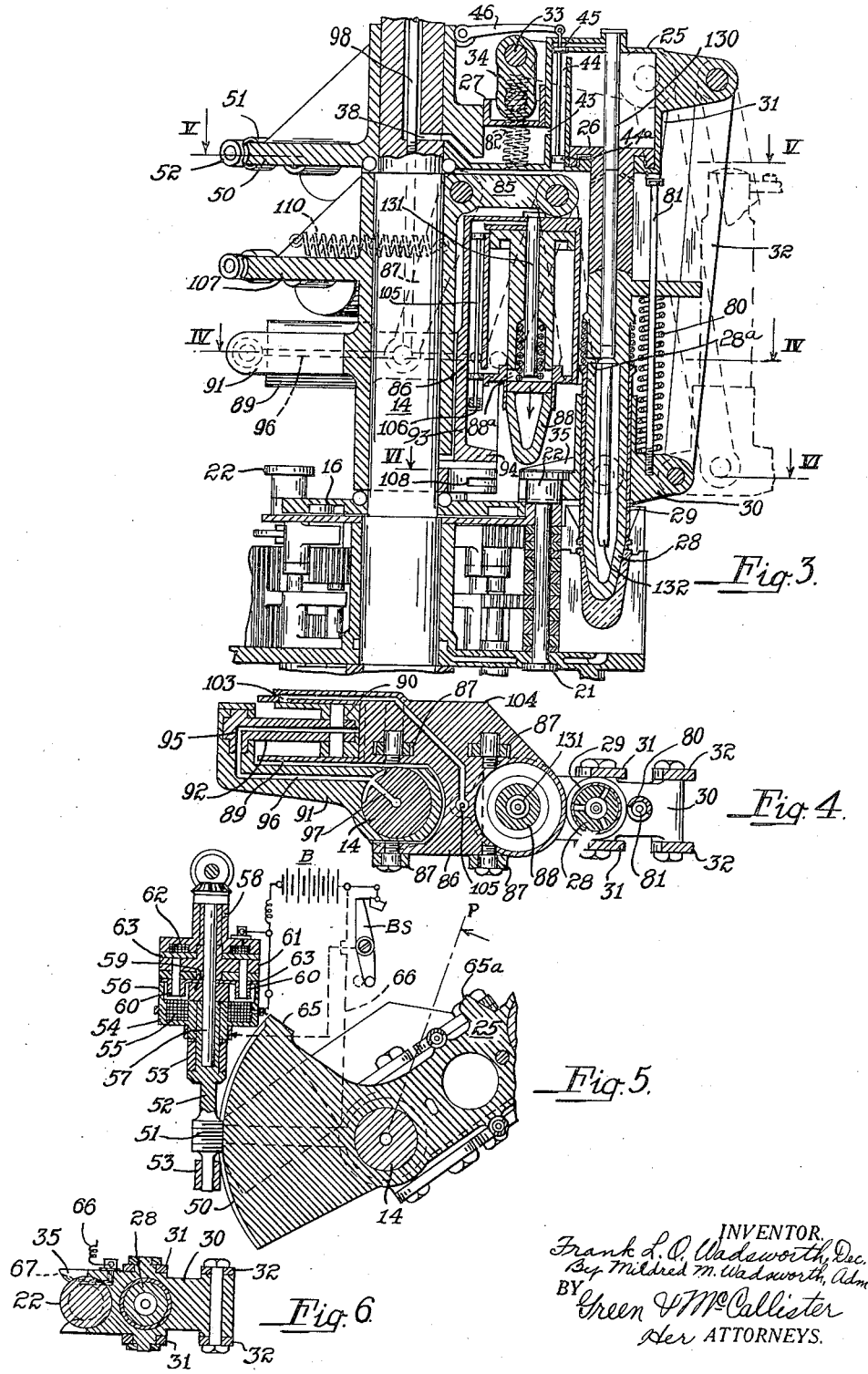
INVENTOR
Frank L. O. Wadsworth, Dec.
By Mildred M. Wadsworth, Adm.
BY Green & McCallister
Her ATTORNEYS.

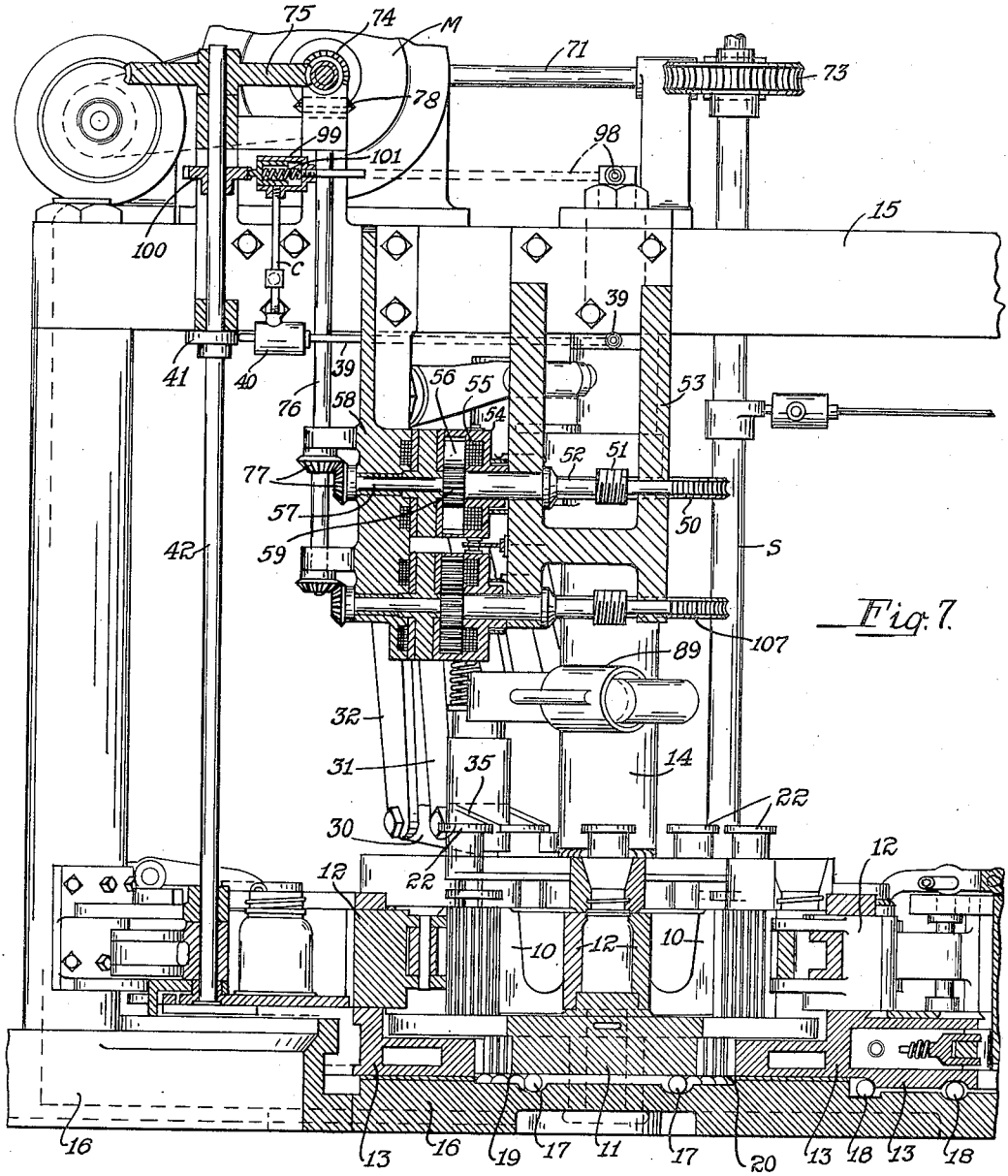
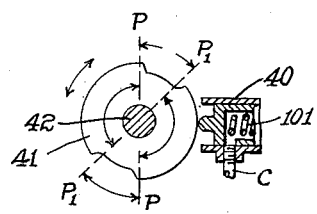
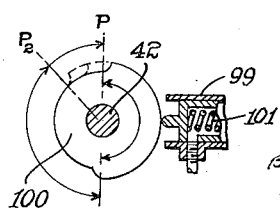

Patented Oct. 8, 1940

2,217,425

UNITED STATES PATENT OFFICE 2,217,425

GLASS PRESSING MACHINE

Frank L. O. Wadsworth, deceased, late of Pittsburgh, Pa., by Mildred M. Wadsworth, administratrix, Pittsburgh, Pa., assignor to Ball Brothers Company, Muncie, Ind., a corporation of Indiana Original application March 4, 1935, Serial No. 9,133. Divided and this application May 29, 1937, Serial No. 145,452

21 Claims. (Cl. 49—37)

This invention relates to a press and blow machine for forming glass articles and more particularly to a two-table epicentric or annular ring type of forming machine having dual press plungers, and is a division of an application Serial No. 9,133, filed March 4, 1935, filed by Frank L. O. Wadsworth, deceased.

One object of this invention is to provide a machine for shaping glass articles having two mold tables which are continuously rotated and on one of which the charges of glass are adapted to be initially pressed or shaped in press molds without interrupting the continuous movement of the mold tables and without changing the relative position of the press molds thereon, and the pressed or shaped blanks are transferred to the molds of the other table while such tables are rotating.

Another object is to effect this pressing operation with not more than two plunger mechanisms which cooperate alternatively with successively presented molds on the continuously revolving press mold table and which travel with the table during the pressing operation and are then returned to their initial positions to pick up the next succeeding but alternate mold.

Other objects and purposes of this invention will be made apparent by the following detailed description of the construction and mode of operation of one illustrative embodiment of the improvement which is illustrated in the accompanying drawings, wherein Figure 1 is a general plan view of the improved forming apparatus as viewed from a plane above the feeder forehearth;

Fig. 3 is a vertical section on the plane III—III of Fig. 1;

Figs. 4 and 5 are two sectional views on the respective planes IV—IV and V—V of Fig. 3;

Fig. 6 is a sectional detail on the line VI—VI of Fig. 3;

Fig. 7 is an offset sectional elevation on the double plane VII—VII of Fig. 1;

Figs. 8 and 9 are semi-diagrammatic views of valve control elements for operating the press plunger mechanisms.

Figure 1:
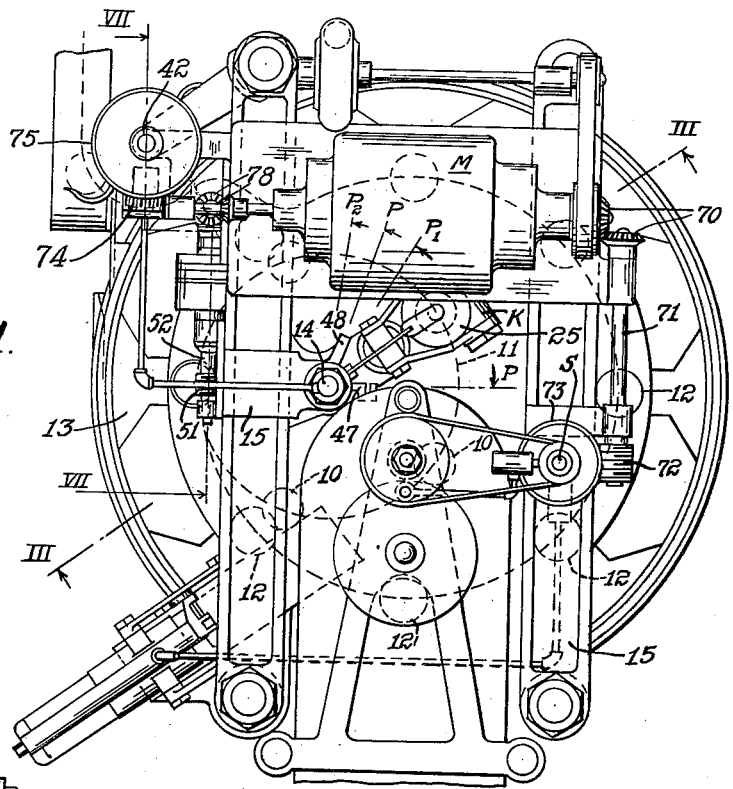
Figure 2:
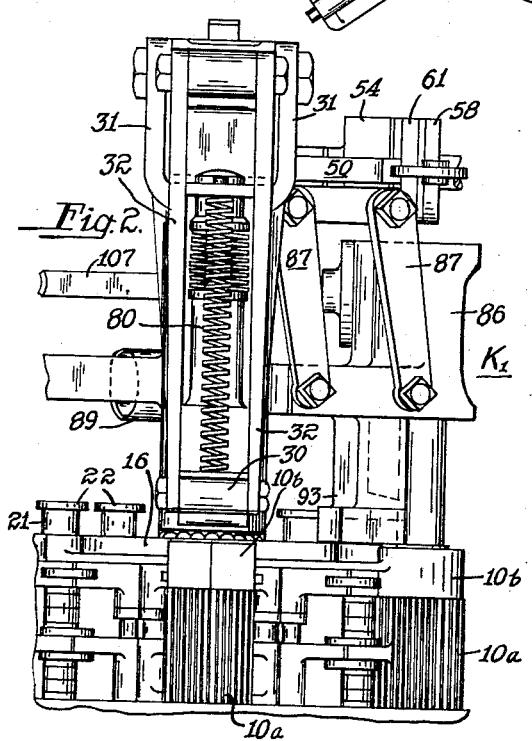
Fig. 2 is an elevation of a portion of the apparatus as viewed from the right hand side of Fig. 1 but with the parts in a different position from that there shown.

In the construction shown in Figs. 1 to 9, inclusive, which illustrates the press plunger assembly in connection with a single deck forming machine, there are five press molds 10 which are supported at angular intervals of 72° on an inner cylindrical table 11 and eight cooperating blow molds 12 which are carried on the inner periphery of an outer annular table 13. The press mold table 11 is revolubly mounted on a stationary vertical column or post 14 which is rigidly secured at opposite ends to the upper and lower members 15 and 16 of the machine frame. The table 11 is supported by an end thrust ball bearing 17 and the blow mold table 13 is rotatably mounted on two rows of balls 18 which are also carried by the base plate 16 and which serve both as a radial guide bearing and an end thrust support for the outer table. The two tables are interconnected by external and internal gear elements 19—20 which are so designed that the centers of the mold units 10 and 12 are constrained to move at the same peripheral speed and their paths of movement will intersect or coincide at the point of contact between the gear elements 19 and 20. The molds 10 and 12 are so positioned on their respective tables that each cooperating pair of these forming units are brought successively into coaxial relationship at this point of contact or tangency, and because of the epicentric positioning of the table axes the paths of movement of the mold centers are nearly coincident over a substantial arc at each side of that point.

Each of the press mold units 10 is composed of the usual body sections 10a and the neck ring sections 10b all of which are coaxially mounted on a vertical pintle bolt 21 that connects the top and bottom platforms of the table 11 and is provided at its upper end with a flanged head 22. Each pair of press molds 10 and the blow molds 12 is provided with the usual means for opening and closing the same in proper timed relation with each other and the press molds are, of course, provided with separate means for opening the body sections and the neck ring sections thereof as is the usual practice in forming machine construction.

Charges of molten glass are delivered to the press molds 10 in the usual manner from a forehearth (not shown) and are preshaped or pressed into blanks while contained in said press molds.

In order to press the charges in the press molds, two complementary press plunger assemblies are provided which act alternately in shaping the charges of molten glass that are delivered to the successively presented molds 10 to the desired parison form in preparation for their transfer to the finishing molds 12. Both of these alternately acting press mechanisms are mounted to swing or oscillate around the axis of revolution of the press mold table 11 i. e., around the center of the table column 14 and each is so constructed that it is automatically locked to the moving table in registry with one of the press molds and is moved therewith through a predetermined arc P—P1 and then at the end of this definite arcuate movement is disengaged from the table and moved back to its initial position (P) during the period of action of the complementary mechanism. These mechanisms are, furthermore, so designed and operated that during their advance movement with the press table they are frictionally driven from an independent source of power and thereby relieve the table driving mechanism from the added duty of intermittently moving the interengaged press assembly, and during their reverse or return travel they are also driven from this same independent source and at any desired speed relative to that of the advance movement.

The press assembly, which may be conveniently designated as a whole by the symbol "K" comprises an overhead block 25 which is rotatably mounted on the upper portion of the column 14 and which is chambered to receive two reciprocable piston members 26 and 27 and a press plunger 28 with an associated concentric follower sleeve 29 which are slidably mounted in a T-shaped guide head 30, that is suspended from the block 25 by two pairs of parallel links 31 and 32. The upper ends of the two links 31—32 are provided with laterally extending arms which are coupled together at their extremities by a spacer bolt 33 and are connected by an I-shaped link 34 to the piston 27. The inner side of the guide head 30 is provided with a flared U-shaped fork 35 (Figs. 6 and 7) which is adapted to closely engage the head 22 of one of the pintle bolts 21 when the press plunger is moved into operative position with respect to one of the press molds 10 and to thereby lock the members 10, 25 and 30 in cooperative registry with each other during the pressing operation.

The lower end of the cylinder chamber for the piston 27 is connected through the passageway and annular port 38 to a pipe 39 that leads to a single acting two way valve 40 which is periodically actuated by a suitable cam 41, on a vertical shaft 42 (Figs. 7 and 8) and which serves to control the admission and exhaust of motive fluid (which is supplied from any suitable source by the conduit C) to and from the aforesaid piston chamber. The shaft 42 is driven at the desired speed through mechanism hereinafter to be described. The upper end of this same chamber is connected by the port 43 with a vertical passageway 44 in the block 25 that contains a balanced double piston valve 45 which serves to control the flow of motive fluid to and from the opposite ends of the cylinder for the piston 26 and which is moved up and down by a lever 46 that is adapted to be engaged at the beginning and end of the oscillatory movements of the block 25 by fixed cams 47—48 on the machine frame (Fig. 1).

The block 25 is also provided with a worm wheel sector 50 that is engaged by a worm 51 on a horizontal shaft 52 which is journaled in a U-shaped bearing block 53 on one of the upper cross beams 15 of the main frame. As best shown in the sectional views of Figs. 5 and 7 the enlarged end of this shaft 52 is secured to a bell shaped steel drum 54 which surrounds a coil 55 of insulated wire and which is provided at its outer edge with a ring of internal gear teeth 56. A cooperating shaft 57 is coaxially journaled in the end of the shaft 52 and in a bearing block 58 and is provided with a gear 59 which is operatively connected to the internal gear 56 by the planet pinions 60 that are rotatably mounted on the ring member 61. The bearing block 58 is provided with another coil 62 of insulated wire one terminal of which is directly connected to the bearing block, and the other of which is insulated therefrom. The opposite sides of the planet ring 61 are faced with soft iron discs 63—63, which cooperate respectively with the contiguous annular flanges on the bearing block 58, and with the adjacent edge portions of the members 56 and 59 in forming substantially closed magnetic circuits when the coils 55 and 62 are energized.

The two terminals of the coil 55 are connected to insulated contact rings which are carried by the internal gear drum 54 and which are engaged by insulated brushes on the bearing supports. One of these brushes is permanently connected, in parallel with the insulated terminal of the coil 62, to one pole of a suitable source of electric current (e. g., the battery B, Fig. 5), and the other brush is connected to the second pole of the battery through a make and break switch BS that is opened and closed by the engagement of the lugs 65—65a on the connected block and worm wheel members 25—50, with the arm of the switch BS. This last mentioned pole is also connected by the insulated wire 66 to the terminal of an insulated contact block 67 that is set in the forward side of the fork 35 of the guide head 30 (Fig. 6); and when the parts 22 and 35 are mechanically engaged (as shown in Figs. 3 and 6), the circuit through the coil 62 is closed (viz. through the frame of the machine, the table members 10—21, etc., and the insulated connections last described) and the planet pinion ring 61 is then magnetically locked to the stationary bearing block 58.

The connected press and blow tables 11 and 13 are driven in unison from a vertical shaft S through suitable gears and pinions (none shown), and the table actuating shaft S and the shaft 42 are both directly connected to a suitable variable speed motor M, which is preferably mounted on the upper cross beams 15 of the machine frame, and which is provided with a rheostat or equivalent control device for regulating its velocity of rotation. The motor shaft is positively coupled to the shaft S by means of the mitre gears 70, the counter shaft 71 and the worm and worm wheel elements 72—73, and is likewise connected to the shaft 42 by the worm and worm wheel gears 74—75.

The shaft 57 to which the pinion 59 is attached, is connected to a vertical shaft 76 by means of mitre gears 77—77; and the shaft 76 is either driven from the main shaft of the motor M (through a second pair of mitre gears 78—78—see Figs. 1 and 7) or from an entirely independent source of power. In either case the tables (11 and 13) and the press assembly frame (K) are, in effect, independently actuated because the table driving shaft S is positively driven (by the train of gearing 70—71—72—73) and the worm shaft 52 is frictionally driven, from the shaft 57 by means of the magnetic clutch elements; and the motor M if only the one is used is sufficiently powerful to operate both driving reins without overloading.

The operation of that portion of the apparatus which has thus far been described is as follows: When a charged press mold 10 approaches the point P (at the beginning of the pressing arc) the valve 40 is moved (by the timer cam 41 on the shaft 42) to admit motive fluid to the space below the piston 27 and the latter is raised to swing the link system 31—32 inwardly, thus bringing the press plunger 28 into alignment with the piston rod extension of the piston 26, and concurrently engaging the forked portion 35 of the guide block 30 with the flanged head 22 of the adjacent mold pintle bolt 21. As soon as the head 22 touches the insulated contact element 67 (and therefore as soon as the moving table tends to impart any rotary movement to the press plunger assembly) the circuit through the coil 62 is closed and the ring 61 is locked to the stationary bearing member 58. At this time the switch BS is open (see infra), and the current through the coil 55 is therefore broken, and under these circumstances the locking of the previously free ring gear elements 60—61 immediately imparts a rotary movement to the worm shaft 52 (in a direction opposite to that in which the shaft and gear elements 57 and 59 are revolving)—and this in turn moves the worm wheel 50, and the associated press plunger assembly in the same direction, and at the same speed as the revolving table 11; so that even before the complete engagement of the members 35 and 22 the cooperating table and press assembly parts are moving in unison, and there is no shock or jar incident upon such engagement. The attainment of this result may be facilitated, if desired, by so proportioning the elements of the two driving trains, for the shafts S and 57, that the latter tends to move the worm 51 forward at a slightly greater angular speed than the table 11 and thus imparts a very slight pull—rather than any slight drag—on the positively driven table assembly.

The lifting of the piston 27 uncovers the port 43 and thus admits motive fluid to the chamber 44 of the valve 45 and since the valve is at this time in the position shown in full lines in Fig. 3 (see infra) this motive fluid passes to the upper end of the cylinder containing the piston 26 and moves it downward until its piston rod extension engages the upper end of the press plunger 28 and depresses the latter to shape the charge of glass in the associated press mold 10. As the interlocked table and press assembly approach the end of the pressing arc, the valve shift lever 46 is engaged by the fixed cam 48 on the machine frame and the valve 45 is moved downward to admit live motive fluid from the chamber 44 through the part 44a into the lower end of the piston chamber, and concurrently open the upper end thereof to the exhaust. This raises the piston 26 and allows the plunger 28 to be lifted by the return spring 80 until its upward movement is arrested by the head of the adjustable stop bolt 81. The valve 40 is then moved to cut off connection with the source of fluid pressure and open the pipe 39 to the atmosphere, thus permitting the piston 27 to be returned to its lower position by the action of the return springs 82. This return movement swings the link system 31—32 together with the suspended block 30 outwardly to the dotted line position shown in Fig. 3, thus disengaging the press assembly from the table 11 and also breaking the connection between the pintle bolt head 22 and the contact element 35. This interrupts the circuit through the coil 62 and releases the planetary gear ring 61 from the fixed bearing member 58 thus permitting it to revolve freely on the shaft 57 without imparting any further movement to the worm shaft drum 54. The latter will however continue to revolve under its own momentum until the further slight advance of the worm wheel 50 causes the lug 65a to complete the closure of the switch BS and thus close the circuit through the coil 55.

When this is done the gear elements 56 and 60 will all be magnetically locked to each other, and the worm and worm shaft 51—52 will be revolved in the same direction as the shaft 57 thereby rotating the worm 51 in a reverse (counterclockwise) direction and returning the connected press assembly frame to its initial position. As the frame approaches this position the valve shift lever 46 is engaged by the other fixed cam 47 on the machine frame, and the valve 45 is again lifted to the full line position of Fig. 3. At the end of the return movement the lug 65 on the worm wheel 50 engages and opens the switch BS thus breaking the circuit through the coil 55 and leaving the planetary gear ring 61 free to revolve on the shaft 57 without imparting any further rotation to the worm and worm wheel elements 51 and 59. The press assembly will then remain at rest until the next successive action of the control valve 40 again admits motive fluid to the lower side of the piston 27 and thus initiates another cycle of the above described operations.

It will be obvious that the time required for the return of the press assembly is less than that occupied in its forward movement; and that the ratio of these times may be varied to any desired degree by correspondingly varying the relative pitch diameters of the gears 56 and 59. If, therefore, one makes the pressing arc P—P1 somewhat less than that shown in Fig. 1 (i. e., less than the angular interval between two press mold centers); and makes the return movement sufficiently rapid (by increasing the ratio between the pitch diameters of the gears 56 and 59) one can reduce the time of the above described cycle to less than that required for moving successive molds into receiving and pressing positions; and under such circumstances one can perform all of the shaping operations with one oscillating plunger assembly.

When operating in this manner the cam element 41 must be of the form shown in Fig. 8, i. e., it must be so shaped as to actuate the control valve 40 twice in each revolution of the shaft 42, or once for each movement of the press table through the angular interval between successive mold centers.

The shaping of all of the mold charges with a single pressing mechanism necessarily limits the time during which the press plunger can remain in contact with the glass; and in order to avoid this limitation—without decreasing the speed of rotation of the press mold table or reducing the number of molds thereon—the inventor has here provided a second, or complementary, pressing assembly K1 which as already stated is adapted to act alternately with the one above described and which is moved forward to press the charge in an associated mold while the other assembly K is being returned to its initial position. This makes it possible to use a pressing arc P—P2 (Fig. 1) which may be considerably longer than the angular interval P—P between the press mold centers—because of the increased speed and decreased time, of return which is obtained by the use of the epicyclic train of gearing between the shafts 52 and 57 and also makes it possible (see infra) to arrange the successive molds en echelon, in two or more superimposed banks or tiers (as indicated diagrammatically in Figs. 10 and 11), and thereby obtain a more compact arrangement.

The second (complementary) press plunger assembly K1 which has been illustrated both as it would appear in section on the plane III—III (when radially aligned on its return movement with the forwardly moving press assembly K), and also as it appears in elevation at or near the end (P1) of its advance movement (with the press assembly K at the beginning P of its pressing arc) comprises a supporting head 85 which is rotatably mounted on the press table column 14; a cylinder block 86 which is suspended from this head on two pairs of parallel links 87—87 and which is provided with the reciprocable piston plunger 88; and a locking cylinder 89 which forms an integral part of the cylinder block 86 and which cooperates with a piston 90 that is flexibly coupled to a projecting arm 91 on the head 85 by a connecting rod 92. The cylinder block 86 has a downwardly extending arm 93 which is provided at its lower end with a flared U-shaped fork 94 similar to the fork 35 shown in Fig. 6, that is adapted to engage the flanged head 22 of an adjacent press mold pintle bolt 21 (when the members 86—88—94 etc. are swung outwardly on the supporting link system 87—87) and to thereby lock the complementary press assembly to the press mold table 11. Motive fluid is admitted to the front (closed) end of the cylinder 89 through the communicating passageways 95—96 in the connecting rod and arm elements 92—91 and the annular port and passage 97 which leads to a pipe 98 that passes upwardly through the central opening 38 in the column 14, and is connected at its upper end with a control valve 99 (Figs. 3 and 7). This valve, like the valve 40, is actuated by a suitable cam 100 on the positively driven take-off shaft 42 and both valves 40—99 are so constructed that when they are moved to the right (by the cam 41 or 100) the pipes 39 or 98 are connected to a suitable source of fluid pressure (e. g. the compressed air conduit C) and when moved to the left (under the joint influence of the fluid pressure on the head of the valve and the tension of a return spring 101) the said pipes are opened to the atmosphere (Figs. 8 and 9).

The cylinder 89 is provided at an intermediate point in its length with a side port 103 that is connected by the passage 104 with a vertical chamber in the cylinder block 86 which contains the balanced double piston valve 105. This valve is similar in construction and mode of action to the valve 45 (supra) and serves to control the admission and exhaust of motive fluid to and from the ends of the chamber in which the piston plunger 88 reciprocates; and, like the valve 45 is moved up and down by a valve shift lever 106 that is engaged near the ends of the advance and return movements of the head 85 by fixed cams (not shown but which are similar to the cams 47—48) on the frame of the machine.

The head 85 is provided with a worm wheel sector 107 which is of the same form as the corresponding sector 50 of the head 25 (Fig. 5) and which is moved by a worm gear-magnetic clutch-drive mechanism, that is, in all material respects, identical with the one already described (supra).

The operation of the complementary press assembly K1 is substantially the same as the operation of the assembly K; and requires, therefore, only a very brief explanation. As already stated, Figs. 3 and 4 show the position of the parts of the assembly K1 during its return to the initial position P (while the assembly K is moving forward with the table 11) and as it approaches the end of this return movement the valve shift lever 106 is engaged by the adjacent cam on the machine frame to lift the valve 105 to the top of its stroke; and immediately thereafter the associated switch (BS) of the magnetic control mechanism is opened to arrest the clockwise rotation of the members 85—107, etc. When the next press mold 10 arrives at the proper position the valve 99 is moved to the right (to the position shown in Fig. 9) and live motive fluid is thus admitted to the front end of the cylinder 89 to swing the cylinder block 86 forward, on its supporting links 87—87 and bring the press plunger 88 into radial alignment with the path of movement of the press molds 10 etc. This movement also brings the U-shaped fork in the cylinder block extension 93 into engagement with the then adjacent pintle bolt head 22 and as soon as the insulated contact terminal 108 (which corresponds to the terminal 67 in the head 30) touches the member 22 the magnetic clutch driving mechanism is actuated to advance the associated worm wheel member 107 and rotate the press assembly K1 in unison with the moving table 11 as already explained in the description of the assembly K (supra).

The forward movement of the cylinder 89 relative to the piston 90 uncovers the port 103 and thus admits live motive fluid to the top of the piston plunger member 88, thereby depressing the latter to shape the charge of glass in the subjacent mold 10. As the complementary press assembly approaches the end of its pressing arc the valve shift lever 106 is engaged by the associated cam in the machine frame and the valve 105 is moved down (to the full line position of Fig. 3) thus admitting live motive fluid to the lower end of the plunger cylinder and lifting the plunger 88 out of the mold. At the end of the advance swing of the press assembly K1 the valve 99 is moved to the left (full line position of Fig. 7) to exhaust the cylinder 89 and the cylinder block 86 is then swung inwardly by the springs 110 thus disengaging the forked member 94 from the pintle bolt head 22 and concurrently breaking the contact between it and the insulated terminal 108. The head 85 and its associated parts are then returned to initial position in the same manner as the head 25 (supra) ready for a repetition of the last described cycle of operation.

It is obvious that the press assembly K1 can be used alone (or without the assembly K) to shape all of the successively presented charges of glass in the press molds 10 if the pressing arc P—P1 is made less than the angular interval (P—P) between the successive press mold centers; and if the time of the return movement is sufficiently reduced. In such a case the cam 100, which actuates the valve 99, must be of the same character as that shown in Fig. 8; i. e., it must be a twin lobed cam that is adapted to open and close the valve twice in each revolution of the shaft 42 or once for each movement of the table 11 through one-fifth of a revolution (for a five press mold assembly).

When the two complementary press assemblies K and K1 are used in conjunction or combination with each other, each operates on alternately presented press molds; and the cyclic action of each therefore covers a period during which the table 11 revolves through an arc equal to twice the angular interval between two successive molds (i. e., in this case an arc of 144 degrees); and both of the cams 41 and 100 are in that case of the form illustrated in Fig. 9, i. e., they are both single lobe cams which act to open and close the valves 40 and 99 only once in each revolution of the shaft 42. As already stated, the use of two complementary press assemblies enables one to use a pressing arc P—P2 which is materially longer than is possible with only one press assembly; and, as indicated in dotted lines in Fig. 9, the active lobe of the cam 100 may therefore considerably exceed 180 degrees— which corresponds to a movement of the press mold table through 72 degrees for a five mold assembly—because the time occupied in the return movement may be made materially less than that required for the advance pressing movement. It will, of course, be understood that the angular length of the worm wheel sectors 50 and 107 (and the angular spacing of the switch engaging lugs 65—65a) must, in such cases, be made greater than that shown in Fig. 5; but this involves only a structural reproportioning of these parts and does not introduce any change in the functional action or the operative performance of the cooperative mechanisms.

In the construction shown in Figs. 1 to 9, inclusive the invention has been illustrated as applied to a single deck arrangement of epicentrically positioned blow mold tables, that is, one in which all of the forming units are arranged on one level, but it is to be understood that my invention may also be employed in a double deck or a triple deck construction in which the press and blow molds are arranged en echelon in two or more superimposed tiers or banks arranged in staggered or interdigited relation on two or more levels. Multiple deck construction is made up by the vertical superposition of two or more such table assemblies as hereinbefore described in such angular relationship that the molds on successive decks are advanced approximately by one half or one third (depending upon whether it is a two or three deck table) of the angular interval between the molds on the adjacent deck. It will be understood, of course, that in this multiple deck construction all of the supporting platforms for the superimposed banks of press molds are structurally connected to form a substantially integral table member which revolves as a unit on its bearing supports and that all of the superimposed platform supports for the corresponding banks of blow molds are likewise connected, supported and driven as one structural unit.

In the case of a double deck construction, the charges of glass in the upper banks of press molds are shaped to form by a plunger assembly similar in all respects to the one previously designated by the symbol K1 and the glass delivered to the lower tier of molds is shaped by a press assembly corresponding in detail to the one designated K, save only that the detachable plunger member 28 and its associated supports are sufficiently lengthy to properly cooperate with the mold assembly on the lower level.

Figures 10, 11:
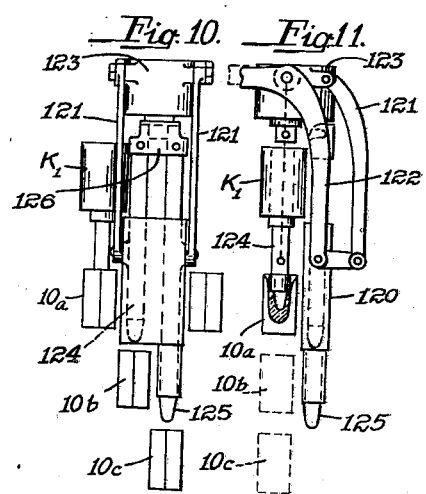
Figs. 10 and 11 are semi-diagrammatic front and side elevations of modified press plunger mechanisms which may be employed in connection with a forming machine having three decks of molds thereon.

In the case of a triple deck construction such as indicated in Figs. 10 and 11, the press assembly for shaping the glass charges in the uppermost row of molds 10a may also be identical with the one referred to as K1 but the glass in the two lower tiers of the press molds 10b and 10c is shaped to form by a double plunger assembly which acts simultaneously on the charges in the two adjacent molds 10b and 10c and which comprises a single guide head 120 which is suspended on two pairs of parallel links 121 and 122 from the large cylinder block 123 (corresponding to the block 25 of assembly K) and to press plungers 124 and 125 of different lengths which cooperate respectively with the molds 10b and 10c. These pressing members 124 and 125 can be simultaneously actuated when swung into operative position over the molds 10b and 10c by means of a single cylinder and piston assembly which is adapted to be engaged with an equalizing cross head 126 that connects the upper ends of plungers 124 and 125 and serves to balance the pressure to which they are subjected by the single pneumatically actuated piston. The links 122 are connected to a piston of an auxiliary cylinder (corresponding to 27) which serves to swing the guide head into and out of operative position with respect to the press mold table and the two tiers of press molds 10b and 10c, and in all other essential respects the double plunger assembly last described corresponds structurally and functionally to the one designated as K.

A high speed of operation also makes it desirable to make provision for accelerating the cooling of each press plunger (particularly when only one is used) and in the practice of this invention this is accomplished by making each press plunger 88 hollow and discharging the exhaust air from the upper end of the plunger piston cylinders through these hollow pressing members. This is done by closing the upper ends of the chambers in which the valves 45—105 are mounted and connecting these closed ends to hollow tubes 130—131 which are rigidly fixed in the centers of the hollow interiors of the plunger piston members 26—30 or 88. The intermediate portions of these members are provided with radial ports 28a—28a which connect the interior of the plunger to the outside end and when the valve 45 or 105 is moved down to effect the return of a piston plunger member to its upper position the compressed motive fluid above the piston is discharged through the downwardly extending tube 130 or 131 into the lower end of the corresponding plunger and then escapes through these ports 28a—88a to the atmosphere.

In the case of the first described press assembly K, where the piston rod of the piston 26 is separately connected to the press plunger 28, the latter is preferably provided with an auxiliary tube 132 which is fixed at its upper end in the plunger 28 and which is extended downwardly to a point adjacent the lower end thereof so as to obtain more effective discharge of the exhaust air against the hottest portion of the pressing member. The motive fluid which is used in the pressing operations is preferably at a high pressure because it is desirable to make the press cylinders—as well as other parts of the oscillating press assemblies— as small and as light as possible (to minimize inertial effects at the beginning and end of their oscillatory movements); and when this high pressure fluid is exhausted and expanded it will be greatly reduced in temperature and will, therefore, be in a condition to effectively cool the heated ends of the press plunger members against whch it is discharged. This cooling effect may, if desired, be augmented by charging the high pressure fluid in the supply conduit C with water vapor or mist.

With the foregoing disclosure as a guide, engineers, and others skilled in this art, will be enabled to utilize the characteristic features and operative advantages of the present invention in many other forms of glass forming machines. It will also be apparent to such skilled workers that certain features of the hereindescribed improvements are applicable to press mechanisms per se, viz, machines in which the shaping of the glass articles is effected solely by pressing and without any subsequent blowing action, and that when so applied the advantages attained are comparable and commensurate with many of those herein set forth. For these reasons it is not wished to limit this invention by reference to any particular species of construction which has been described as exemplary of the present improvement or to have these improvements defined in any less comprehensive way than is warranted by the appended claims.

What is claimed as new and desired to be secured by Letters Patent is:

1. In combination in a machine for fabricating glass articles from molten glass, a mold, a hollow press plunger adapted to move into and out of said mold, means responsive to fluid pressure for actuating said plunger and means for exhausting motive fluid from said plunger actuating means into said plunger to cool the same.

2. In combination in a machine for fabricating glass articles from molten glass, a mold, a hollow press plunger, a piston and cylinder assembly for moving said plunger into and out of said mold, means for delivering motive fluid to said cylinder and means for delivering motive fluid exhausted from said cylinder into said plunger to cool the same.

3. In combination in a machine for forming glass articles from molten glass, a mold, a hollow plunger, a piston and cylinder assembly for moving said plunger into and out of said mold, means for delivering motive fluid to the cylinder of said assembly and means for delivering motive fluid exhausted from said cylinder into the interior of said piston as said piston is moved out of said mold.

4. In a glass forming machine, a continuously rotating table, press molds carried by said table, a press assembly mounted to oscillate about the center of rotation of said table, means for locking said assembly to said table, and electromagnetically controlled means for alternately moving said assembly in opposite directions.

5. In a glass forming machine, a rotating table, a press mold carried by said table, a press assembly for cooperating with said mold and mounted to move with, and in the opposite direction to that of the movement of said table, means for swinging said assembly into locking engagement with said table and means for initiating a movement of such assembly with said table prior to such locking engagement and for continuing such movement after such engagement.

6. In a machine for fabricating glass articles, a rotating press table, a series of molds carried by said table, each such mold located at the same radial distance from the center of said table, two oscillating press assemblies and means for operating each such assembly that the assemblies alternately cooperate with successive molds of said series and travel with said table during such cooperation and in the opposite direction during the remaining period.

7. In a glass fabricating machine, a mold carrying table, a series of molds carried by said table and located to travel in a circular path, two press assemblies mounted to rotate coaxially with said table, means for rotating said table and means for alternately locking said press assemblies to said table during the rotation thereof.

8. In a glass fabricating machine, a mold carrying table, two series of molds carried thereby, a press assembly including two press plungers and means for actuating said plungers so that both simultaneously cooperate with a mold of each series.

9. In a glass fabricating machine, a mold carrying table, two series of molds carried by said table at different elevations thereon, means for rotating said table, a press assembly including two press plungers and actuating means therefor, each plunger adapted to cooperate with the molds of one series, means for alternately locking said assembly to and releasing it from said table and means for moving said assembly in a direction opposite to that of the movement of the table when released therefrom.

10. In a glass fabricating machine, a mold carrying table, a plurality of molds carried by said table and arranged in two concentric circular series, means for rotating said table, two press assemblies mounted for rotation with said table and each including a press plunger and actuating means therefor, means for alternately locking said assemblies to said table and means for moving each assembly in a direction opposite to that of the rotation of the table when released therefrom.

11. In a glass fabricating machine, a mold carrying table, at least one mold carried by said table, means for moving the table, a press assembly mounted for motion with said table, including a press plunger actuating means and a press plunger, and means for moving said plunger into and out of operative engagement with said actuating means.

12. In a glass fabricating machine, a mold table, at least one mold carried by said table, means for rotating said table, a press assembly mounted to rotate with said table and including a press plunger and press plunger actuating means, means for moving said press plunger into and out of engagement with said actuating means and means actuated by said plunger, moving means for locking said assembly to said table and disengaging it therefrom.

13. In a glass fabricating machine, a rotating table, a series of molds carried by said table, a press assembly mounted coaxially with said table, a press plunger carried by said assembly, means for periodically moving said press plunger into and out of position over a mold on said table, for locking said assembly to said table and for releasing the same, means for moving said plunger into said mold, and means for driving said assembly in the direction of travel of said table while said assembly is locked thereto and in the opposite direction when said assembly is released therefrom.

14. In a glass fabricating machine, a rotating table, a series of molds carried by said table, a press assembly mounted coaxially with said table, a press plunger carried by said assembly, means for periodically moving said press plunger into and out of position over a mold on said table, for locking said assembly to said table and for releasing the same, means for moving said plunger into said mold, and an electromagnetically controlled means for oscillating said assembly.

15. In a glass fabricating machine, a rotating table, a series of molds carried by said table, an oscillatory press assembly mounted coaxially with said table, means for periodically locking said assembly to said table and for releasing it therefrom, oscillating means for said assembly, and means responsive to the locking of said assembly to said table for actuating said oscillating means to turn said assembly in the direction of travel of said table.

16. In a glass fabricating machine, a continuously rotating table, a series of molds carried by said table, a press plunger carried by said assembly, means for periodically locking said assembly to said table with the press plunger over a mold on said table, means for oscillating said assembly, means responsive to the locking of said assembly to said table for actuating said turning means to move the assembly in the direction of travel of said table, and means for reversing said assembly turning means when said assembly is released from said table.

17. In a glass fabricating machine, a rotatable press table, a series of press molds carried by said table, means for rotating said table, a press plunger assembly mounted for oscillation above the molds on said table, means for periodically locking said assembly to said table, and means for turning said assembly including a driven member, a magnetic clutch for connecting said driven member to said assembly, and means responsive to the locking of said assembly to said table for actuating said clutch.

18. In a glass fabricating machine, a rotatable press table, a series of press molds carried by said table, means for rotating said table, a press plunger assembly mounted for oscillation above the molds on said table, means for periodically locking said assembly to said table and for releasing said assembly from said table, and means for oscillating said assembly including a driven member, a driving member, an electro-magnetically controlled means for connecting said driven member to said driving member, and means responsive to the locking of said assembly to said table for energizing said electromagnetic means.

19. In a glass fabricating machine, a rotatable press table, a series of press molds carried by said table, means for rotating said table, a press plunger assembly mounted for oscillation above the molds on said table, a cylinder carried by said assembly, a piston reciprocating in said cylinder, means controlled by the reciprocation of said piston for locking said assembly to said table and for releasing it therefrom, and means for moving said assembly in one direction when the assembly is locked to said table and in the opposite direction when it is released therefrom.

20. In a glass fabricating machine, a rotatable press mold table, a series of molds carried by said table, means for rotating said table, an oscillatory press assembly mounted for oscillation above the molds on said table, a press plunger, parallel links connecting said plunger to said assembly, means for swinging said plunger to and from a position over a mold on said table, means operable when said plunger is in position over a mold for moving the same into such mold, means carried by said links for locking said assembly to said table when the plunger is in position over a mold, means for withdrawing the plunger from said mold, and means for returning said links and the plunger carried thereby to their initial position to release said assembly from said table.

21. In a glass fabricating machine, a rotatable press mold table, a series of molds carried by said table, means for rotating said table, an oscillatory press assembly mounted for oscillation above the molds on said table, a press plunger, parallel links connecting said plunger to said assembly, means for swinging said plunger to and from a position over a mold on said table, means operable when said plunger is in position over a mold for moving the same into such mold, means carried by said links for locking said assembly to said table when the plunger is in position over a mold, means for withdrawing the plunger from said mold, means for returning said links and the plunger carried thereby to their initial position to release said assembly from said table, and means for driving said assembly in the direction of travel of said table when the assembly is locked thereto and for turning the assembly in the opposite direction when said assembly has been released therefrom.

MILDRED M. WADSWORTH,
*Administratrix of the Estate of Frank L. O. Wadsworth, Deceased.*